United States Patent Office 2,964,516
Patented Dec. 13, 1960

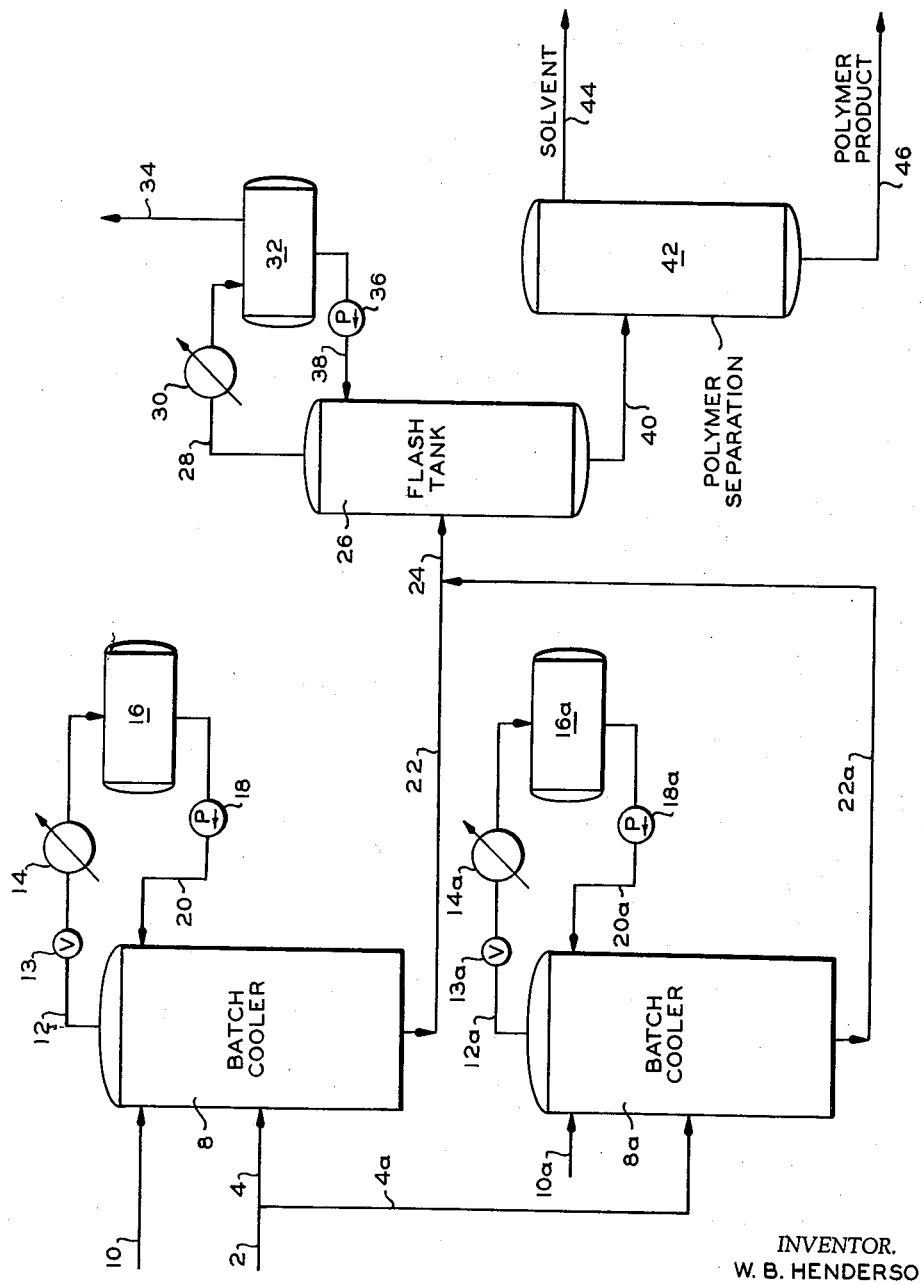

2,964,516

RECOVERY OF OLEFIN POLYMERS FROM SOLUTION

William B. Henderson, Decatur, Ala., assignor to Phillips Petroleum Company, a corporation of Delaware Filed July 11, 1957, Ser. No. 671,224

4 Claims. (Cl. 260—94.9)

This invention relates to the recovery of solid olefin polymers from solution. More particularly, it relates to an improved process for precipitating solid olefin polymers from solution by cooling. Still more particularly, it relates to the separation of solid olefin polymers from solution in a two stage process which involves controlled cooling followed by flashing.

This application is a continuation-in-part of Serial No. 601,066, filed July 30, 1956, now abandoned.

As used herein the term solid polymers includes, in addition to the normally solid materials, those polymers of lower molecular weight which are tacky in nature and also semi-solid waxy type polymers.

Solid olefin polymers treated in the method of this invention are prepared by a number of methods which usually result in a product which is dissolved in a diluent or solvent material. Inasmuch as the polymers are usable primarily in a solid condition, it becomes necessary to precipitate or otherwise remove the solid polymer from solution. Various methods have been proposed for this purpose, however, difficulties have arisen in that the characteristics of the polymer products obtained by conventional methods appear to be greatly affected by the particular separation process employed. Thus, in one process the polymer is precipitated from solution in a "superfine" condition of subdivision which makes it difficult to effect recovery of the precipitated solid from the solvent. In another method, the precipitated polymer contains a quantity of small crystalline particles which form imperfections when the polymer is formed into a film product. These imperfections which are usually of a size to be just preceptible to the eye are sometimes called "fish eyes" in the art. In another method of treatment, the polymer removed from solution is stringy or fibrous in nature and, therefore, does not provide the type of product which is readily recovered from the solvent by filtration, centrifugation or other conventional means. It is desirable to obtain a homogeneous product that is solid polymer having a substantially uniform product size or range of size so that separation of the precipitated material from the solvent is readily effected and so that quality control of finished products of the polymer can be established.

In a copending application of R. A. Findlay, Serial No. 591,864, filed June 18, 1956, a method of operation which overcomes these difficulties has been proposed. In carrying out this improved process, precipitation of polymer from solution is effected in a batch precipitation operation in which the solution is introduced to a batch cooling zone from which heat is removed by autorefrigeration, namely by reducing the pressure on the solution. The rate of pressure reduction is controlled to provide a substantially uniform rate of temperature decrease in the solution whereby polymer is precipitated. Following precipitation, the polymer and solvent are removed from the cooling zone for further treatment for the recovery of the precipitated polymer and the cooling zone is reheated in preparation to receive a fresh charge of solution. It has been found that the foregoing method of operation provides a homogeneous product having a substantially uniform range of product size, which is easily filtered.

The method of this invention is related to the above process and constitutes an improvement over said process.

It is an object of this invention to provide an improved process for the recovery of solid olefin polymers from solution.

Another object of the invention is to provide an improved process for the precipitation of olefin polymers from solution by cooling.

Still another object of the invention is to provide an improved process for reducing the equipment and power required for the recovery of solid olefin polymers from solution by cooling.

These and other objects of the invention will become more readily apparent from the following detailed description and discussion.

In their broadest aspect, the foregoing objects are achieved by introducing solid olefin polymers, which are dissolved in a solvent material, into a batch cooling zone wherein the solution is cooled by autorefrigeration at a controlled uniform rate until a portion of the polymer precipitates. After completion of the cooling cycle, the precipitated polymer-solvent mixture is removed from the cooling zone and is passed to a flash zone which is maintained at a substantially constant subatmospheric pressure wherein the temperature is further lowered to precipitate the remaining polymer. The controlled cooling operation is carried out under conditions such that the minimum pressure in the batch cooling zone is atmospheric pressure.

In the process of this invention, that portion of the dissolved polymer which will precipitate at atmospheric pressure is removed by autorefrigeration and the remainder is removed by flashing at a susbtantially constant subatmospheric pressure. This type of operation presents a number of advantages over a system wherein all of the polymer removal is effected at a controlled rate of cooling. It has been found that the major portion of the polymer which is contained in the solution can be precipitated at atmospheric pressure. Thus, the major portion of the desired product can be obtained in a suitable form for filtering and further processing by controlled cooling under non-vacuum conditions. It has further been found that if the remaining polymer is removed by flashing at a constant low pressure, even though the properties of the polymer are not as desirable as the material obtained by controlled cooling precipitation, the amount of polymer recovered in this second operation is not sufficient to affect the filterability of the polymer product as a whole when the two precipitates are combined. Inasmuch as the second operation, namely flashing at a constant pressure, is substantially an instantaneous process, the time which would be required in a controlled cooling process in passing from atmospheric pressure to the flashing pressure is no longer required. As related to an operating process, operating in this manner provides either a substantial reduction in the size of the batch coolers required for a given polymer feed rate or a susbtantial increase in throughput when using existing batch cooler. Since the flashing operation requires only a small vessel, the two-stage process provides a substantial decrease in equipment costs per pound of solution treated. In addition, inasmuch as one flash vessel is capable of handling precipitated polymer and solution from a number of batch coolers of much larger size, the problem of air leakage is substantially reduced, which provides a commensurate decrease in the power required for refrigeration.

The polymers which are treated within the scope of this invention include a wide variety of olefin polymers, such as, for example, polymers or copolymers of monoolefins like ethylene, propylene, butylene, etc., also copolymers of monoolefins and diolefins such as butadiene, isoprene, etc. The invention is particularly applicable to polymers of 1-olefins having a maximum of 8 carbon atoms per molecule and no branching nearer the double bond than the 4-position.

The various polymers which are treated in this invention are prepared usually by contacting the olefin to be polymerized with a catalyst in the presence of a diluent or solvent at an elevated temperature and pressure. A number of catalysts may be used for this purpose, including chromium oxide, preferably containing hexavalent chromium, with silica, alumina, zirconia, thoria, silica-alumina, etc. Various organo-metallic compounds, such as triethyl aluminum plus titanium tetrachloride, mixtures of ethylaluminum halides with titanium chlorides, and the like, may also be used. Still another group of catalysts which find use in the preparation of olefin polymers comprise a halide of a group IV metal, such as for example, titanium tetrachloride, silicon tetrabromide, zirconium tetrachloride, tin tetrabromide, etc., with one or more free metals selected from the group consisting of sodium, potassium, lithium, rubidium, zinc, cadmium, aluminum, etc.

The temperature required for polymerizing olefins varies over a wide range, however, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is least about 100 to 300 p.s.i.g., depending upon the type of feed material and the polymerization temperature. Higher pressures up to 500 to 700 p.s.i.g. or higher can be used, if desired. The space velocity varies from as low as about 0.1 to about 20 volumes of feed per volume of catalyst, with the preferred range being between about 1 and about 6 volumes per volume.

The use of a diluent or solvent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general paraffins which dissolve the polymers at the temperature employed in the reaction zone. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature may also be employed. All of the foregoing and in addition, other hydrocarbon diluents which are relatively inert and in the liquid state at the reaction conditions may also be employed in carrying out the reaction of olefins to form solid polymers.

In a preferred embodiment, the invention is directed to the precipitation and recovery from solution of polymers, of ethylene which have a density of at least 0.94 and preferably 0.96 or higher and a crystallinity of at least 70 percent and preferably at least 80 percent at normal atmospheric temperatures. It has been found that these poymers are particularly suited to treatment by the method disclosed herein. While the treatment of these polymers provides a preferred embodiment of the invention, other polymers as related above, are also treated and it is not intended that the scope of the invention be limited to the treatment of any particular polymer or polymers.

One method of preparing polymers of olefins is described in detail in a copending application of Hogan and Banks, Serial No. 476,306, filed December 30, 1954. This particular method utilizes a chromium oxide catalyst, preferably containing hexavalent chromium, with silica, alumina, silica-alumina, zirconia, thoria, etc. In the method of the Hogan et al application, olefins are often polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity.

Other procedures which employ different catalysts may also be used for preparing olefin polymers. For example, polymers are prepared in the presence of organometallic compounds, such as triethylaluminum plus titanium tetrachloride, mixtures of ethylaluminum halides with titanium tetrachloride, and the like. Another group of catalysts which are used comprise a halide of a group IV metal such as, for example, titanium tetrachloride, silicon, tetrabromide, zirconium tetrachloride, tin tetrabromide, etc., with one or more free metals selected from the group consisting of sodium potassium, lithium, rubidium, zinc, cadmium and aluminum.

In carrying out the invention, effluent from a polymerization reaction, comprising a mixture of olefin polymer and hydrocarbon solvent which has been treated for the removal of catalyst and unreacted olefin, is introduced to a batch cooling zone. Generally several zones are provided in parallel so that reaction effluent is continuously entering at least one zone, however, if desired, the operation can be carried out with only one cooling zone by providing surge capacity for the reaction zone effluent. After filling of the cooling zone is completed, the flow of material thereto is stopped and cooling of the solution in the zone is commenced whereby there is provided a uniform rate of temperature decrease. The solubility of the olefin polymers in the solvent material is a function of temperature and as the material is cooled, polymer begins to precipitate from solution. The cooling process is continued until the desired quantity of polymer is precipitated therefrom, after which the cooling zone is emptied and the contents are passed to a flash zone which is maintained at a substantially constant subatmospheric pressure. The material entering this zone is sharply reduced in temperature, almost instantaneously whereby precipitation of the major portion of the remaining polymer takes place. The precipitated zone through a separation zone wherein precipitated polymer and solvent material is then passed from this polymer is separated from the solvent. It is not possible to remove all of the polymer from the solution because of limitations as to the minimum temperature which can be attained in the cooling zone. Thus, the solvent after the removal of precipitated polymer, still contains a small amount of dissolved polymers. This material is treated by another method for the removal of residual polymers.

To provide a homogeneous product of the desired particle size, it is necessary that the rate of cooling be carefully controlled to provide a uniform drop in temperature in the polymer solution. Cooling at too slow a rate produces a product having a very fine particle size which is difficult to filter. Shock chilling on the other hand frequently produces a jelly-like material which also presents recovery problems. In general it has been found desirable to cool the solution between about 1° F. and about 20° F. per minute and preferably between about 5° F. and about 15° F. per minute. For the best results an even narrower cooling range is employed, namely, from between about 6° F. to about 9° F. per minute.

The bulk density of dried product obtained by cooling in this manner varies between about 8 and about 20 pounds per cubic foot, more usually between about 10 and about 12 pounds per cubic foot. The size of the precipitated particles varies usually from between about 50 to about 500 microns.

The operating temperature range in the batch cooler is determined by the temperature at which the polymer precipitates from solution. This in turn is a function of the molecular weight of the polymer and the specific solvent or diluent used. For example, with an ethylene polymer having a molecular weight of between about 15,000 and 25,000, it has been found that a substantial portion of the polymer will precipitate from isooctane at about 180° F. and from cyclohexane at about 165° F. When a heavier polymer, for example, an ethylene polymer having a molecular weight between about 35,000 and about 45,000 is treated, precipitation takes place from cyclohexane at about 170° F. The pressure employed in the controlled cooling step may vary from atmospheric to as high as 50 p.s.i.g. depending on the polymer being treated, the particular solvent used and the proportion of polymer which is to be precipitated. Usually it is preferred to utilize a final cooling zone pressure of atmospheric so that a maximum of polymer precipitation can be effected in this step. The proportion of polymer removed by controlled cooling will depend on the concentration of polymer in the solution entering the cooling zone. Thus, for example, in cooling a polymer of ethylene having a molecular weight between about 35,000 and about 45,000 which is dissolved in cyclohexane, the equilibrium temperature at atmospheric pressure is about 180° F. At this temperature the cyclohexane solvent can contain a maximum of about 1.5 percent polymer by weight. Therefore, if the polymer solution entering the batch cooling zone has a concentration of 6 percent polymer by weight, then approximately 75 percent of the polymer will be precipitated in this zone when the pressure is reduced therein to atmospheric. Similarly, if the polymer solution in the batch cooling zone has a concentration of 3 percent by weight of polymer, then batch cooling to atmospheric pressure will remove only 50 percent of the polymer. It is apparent from the foregoing that the concentration of polymer in the feed solution is an important factor since the proportion of polymer precipitated by controlled cooling must be maintained at a relatively high level in order to obtain a total product of the desired physical characteristics and one which is capable of being easily filtered. In general, it is desirable that between about 25 and about 95 percent of the polymer in solution be precipitated in the controlled cooling operation and preferably not less than about 65 percent.

Depending on the polymer material being treated and the particular solvent being used, the concentration of polymer in the solvent entering the batch cooling zone is maintained usually between about 2 and about 8 percent by weight and preferably between about 3 and about 5 percent by weight.

In carrying out the second stage of the process, namely precipitation by flash vaporization, the material from the batch cooling zone is introduced into a flash zone which is maintained at a substantially constant subatmospheric pressure of between about 10 and about 2 p.s.i.a. The material entering this zone of reduced pressure is reduced in temperature to between about 160 and about 75° F. almost instantaneously. As a result the major portion of the polymers are precipitated from the solution. The total precipitated polymer is then removed from the flash zone as a slurry. Usually this material contains as precipitate, at least about 90 to about 98 percent by weight of the total dissolved polymer. Material remaining in solution, which is usually a heavy oil or waxy material, can be separated from the solvent in a conventional deoiling step or the like.

Precipitation of polymer in the controlled cooling operation is effected by autorefrigeration, namely by evaporating diluent or solvent from a vessel containing the polymer solution. This operation comprises reducing the temperature in the cooling zone by a controlled reduction in pressure which is effected by the use of conventional vacuum equipment. As noted previously, it is desirable to maintain a relatively narrow ratio of solvent to polymer in the cooling zone. This is accomplished usually by introducing makeup solvent or diluent to this zone to replace the material vaporized during cooling.

As previously mentioned, prior art methods of recovering solid polymers from solution by precipitation have suffered from a number of disadvantages and in many instances the physical properties of the recovered polymer have been such as to make separation of precipitated polymer from the solvent extremely difficult. In the method of this invention, the polymer is precipitated as a substantially homogeneous product in that it contains particles having substantially uniform characteristics and within a range of size so as to make them easily separated from the liquid by conventional separation means such as, for example, filtration, centrifugation, etc. In addition, the homogeneity of the product obtained by this invention has made close quality control of finished polymer products possible.

To more clearly describe the invention and provide a better understanding thereof, reference is had to the accompanying drawing which is a diagrammatic illustration of a system for recovering polymer from solution including two batch coolers in parallel with a flash tank in series and a polymer separation vessel and associated auxiliary equipment. Referring to the figure, a solution of ethylene polymers in cyclohexane, prepared by the polymerization of ethylene in the presence of a chromina catalyst, containing hexavalent chromium, with silica alumina at a temperature of about 285° F. and a pressure of about 500 p.s.i.a., is introduced to one of the batch coolers 8 and 8a. As signified by the term "batch," this portion of the process is non-continuous in nature and it is desirable therefore to provide more than one cooler. In this specfic example, the material from the flash concentrator is passed through conduit 4 into batch cooler 8. Prior to entry of the solution into the batch cooler, this vessel is heated by warm cyclohexane introduced through conduit 10 to a suitable temperature level to prevent lowering of the temperature of the entering polymer solution during filling of the cooler. The flow through conduit 4 is continued until the solution in batch cooler 8 reaches a predetermined level, at which time the flow is switched to the other cooler 8a. Conduit 4 is then blocked off and the precipitation portion of the cycle is commenced by gradually reducing the pressure on cooler 8. At this point the solution in the batch cooler contains about 6.0 percent polymer by weight. As the pressure is lowered, a portion of the cyclohexane vaporizes and passes upwardly through conduit 12, condenser 14 and into accumulator 16. That portion of the material condensed in 14 is removed from the accumulator and is usually returned by means of pump 18 through conduit 20 to the cooler 8. If desired, a portion of the material in line 20 may be removed and passed to storage or other use. The reduction in pressure on the batch cooler is effected by opening valve 13. As cyclohexane vaporizes and the temperature in the batch cooler is reduced, polyethylene begins to precipitate from the solution. This operation is continued until the pressure in the cooler reaches substantially atmospheric after which pressure reduction is ceased. At the end of the cooling cycle the major portion of the solid polymer has precipitated, in this particular operation, about 75 percent. In order to maintain the desired concentration of solvent in the cooler, material vaporized therefrom is replaced as previously noted by recycling from accumulator 16. The entire cooling process is carefully controlled and the pressure in the batch cooler is reduced at a rate so as to provide a constant rate of temperature reduction, namely about 7½° F. per minute. If desired, agitation can be provided in the batch cooler, however, usually the turbulence created by evaporation of the solvent is adequate to prevent the precipitated polymer from settling to the bottom of the cooler. In addition, the turbulence which exists during the cooling portion of the cycle also assist in preventing variations in temperature in different areas of the cooling zone.

Upon completion of the cooling cycle, the batch cooler is opened to conduit 22 and the slurried material contained therein is withdrawn and introduced to flash tank 26 which is maintained at a pressure below atmospheric, namely about 6 p.s.i.a. The material entering the flash tank is reduced in pressure almost instantaneously, which provides a sharp decrease in temperature and precipitation of the major part of the remaining dissolved polymer. The solvent flash in this operation passes overhead from the flash tank through conduit 28 and condenser 30 into accumulator 32. Any uncondensed material passes through conduit 34 which communicates with a suitable means for providing a vacuum, such as a vacuum pump. Condensed material is withdrawn from vessel 32 and passed through pump 36 and conduit 38 to the flash tank to replace material vaporized therein. The material in flash tank 26, now comprising the major portion of the polymer as a slurry in cyclohexane solvent, is removed through conduit 40 and introduced to separation means 42 wherein the cyclohexane is separated from the polymer by conventional means, such as filtration followed by drying. The solvent from this step still contains a minor amount of polymer material which can be removed by a deoiling process. Dried polymer product is yielded from the polymer separation zone through conduit 46.

The following data is presented to illustrate a typical application of the aforedescribed embodiment of the invention on a commercial scale. The polyethylene of this example was prepared in the presence of a catalyst comprising 2.5 percent by weight chromium oxide containing hexavalent chromium, with silica alumina, prepared by impregnating particulate silica alumina with a solution of chromium oxide followed by drying and activation in air at gradually increasing temperatures up to 950° F.:

EXAMPLE I

```
Flows                                              lb./hr.
  Feed to batch coolers (8 and 8A)_____ 112,500
    Composition—
      Ethylene _____wt. %__     0.02
      Cyclohexane _____   95.92
      Polyethylene _____    4.06
                                   -------
                                   100.00
  Slurry from bath coolers (22 and 22a)_____ 102,000
    Composition—
      Ethylene _____    0.01
      Cyclohexane _____   95.49
      Polyethylene
        (precipitate) _____    3.00
      Polyethylene
        (in solution) _____    1.50
                                   -------
                                   100.00
  Slurry from flash tank (26)_____ 102,000
    Composition—
      Cyclohexane _____   95.50
      Polyethylene _____    4.50
                                   -------
                                   100.00
  Polyethylene product _____   4,450
                                                  ° F.
Temperatures:
  Feed to flash tank_____ 180
  Flash tank _____ 120
Pressures:                                        p.s.i.a.
  Feed to flash tank_____ 14.7
  Flash tank _____  5.2
Operating cycle of batch cooler:
  7.5 minutes for filling___  Temp. 225° F.    Pressure,
  6.0 minutes for cooling___  (7.5° F. per     33 p.s.i.a.
  7.5 minutes for draining_   minute) Final    Final
  5.1 minutes for reheat___   Temp.—180° F.    pressure,
                                               14.7 p.s.i.a.
Batch cooler size:
  6,000 galons filled aproximately ½ full before beginning
    each cooling cycle.
Flash tank size:
  1,000 gallons. Operated approximately ½ full.
```

Comparing the foregoing example with the example of the copending application of Findlay, page 13, it is to be noted that operating with controlled cooling followed by flashing provides substantially increased throughput, with the only additional equipment required being a small flash vessel.

The specific method of operation illustrated by the accompanying drawing comprises a preferred embodiment of the invention, however, it is not intended that this particular operation be construed in any limiting sense. For example, as previously stated, other methods for providing the cooling, required for precipitation of the polymers may be used. Also, as previously stated, the invention includes the recovery of polymers from solution, other than polymers of ethylene. In addition, the sequence of steps preceding the precipitation process and the various recovery methods given following precipitation, are merely illustrative in nature and other methods for carrying out these steps known to those skilled in the art may be used within the scope of the invention.

Having thus described the invention by providing specific examples thereof, it is to be understood that no undue limitations or restrictions are to be implied by reason thereof but that the scope of the invention is defined by the appended claims.

I claim:
1. In a process wherein a normally solid polymer of a 1-olefin having a maximum of 8 carbon atoms per molecule and no branching nearer the double bond than the 4-position is produced by polymerization of such olefin in the presence of a liquid hydrocarbon selected from the group consisting of acyclic paraffins having from 5 to 12 carbon atoms per molecule, cyclohexane and methylcyclohexane and said polymer is obtained in solution in said solvent, the improvement which comprises introducing such a solution in which the polymer concentration is in the range 2 to 8 weight percent, at a temperature above 165° F. and sufficient to maintain said polymer in solution, into a cooling zone maintained at a temperature between the aforedescribed temperature of said solution and 165° F. and a pressure ranging from atmospheric to about 50 p.s.i.g.; gradually reducing the pressure in said zone, thus causing solvent vaporization, to produce a gradual lowering of temperature, by evaporative cooling, within the range 1 to 20 Fahrenheit degrees per minute, continuing the decrease in temperature and pressure until the pressure reaches approximately atmospheric and the temperature has been lowered to a value in the range 165 to 180° F., thus precipitating from 25 to 95 percent of the total dissolved polymer in granular form; passing the resulting mixture to a flash zone maintained at subatmospheric pressure and a temperature in the range 75 to 160° F. and substantially instantaneously vaporizing sol- vent from said mixture to effect evaporative cooling and precipitation of remaining dissolved polymer; and recovering polymer thus precipitated.

2. A process, for the recovery of a normally solid polymer of ethylene, said polymer having a density in the range 0.94 to 0.96, from solution in a hydrocarbon selected from the group consisting of paraffins having from 5 to 12 carbon atoms per molecule, cyclohexane, and methylcyclohexane, the polymer concentration in said hydrocarbon being in the range 2 to 8 weight percent, which process comprises introducing said solution, at a temperature above 165° F. and sufficient to maintain said polymer in solution, into a cooling zone maintained at a temperature between the aforedescribed temperature of said solution and 165° F. and a pressure ranging from atmospheric to about 50 p.s.i.g.; gradually reducing the pressure in said zone, thus causing solvent vaporization, to produce a gradual lowering of temperature, by exaporative cooling, within the range 1 to 20 Fahrenheit degrees per minute, continuing the decrease in temperature and pressure until the pressure reaches approximately atmospheric and the temperature has been lowered to a value in the range 165 to 180° F., thus precipitating from 25 to 95 percent of the total dissolved polymer in granular form; passing the resulting mixture to a flash zone maintained at subatmospheric pressure and a temperature in the range 75 to 160° F. and substantialy instantaneously vaporizing solvent from said mixture to effect evaporative cooling and precipitation of remaining dissolved polymer; and recovering polymer thus precipitated.

3. A process, for the recovery of a normally solid polymer of ethylene, said polymer having a density in the range 0.94 to 0.96, from solution in cyclohexane, the polymer concentration in said cyclohexane being in the range 2 to 8 weight percent, which process comprises introducing said solution, at a temperature above 165° F. and sufficient to maintain said polymer in solution, into a cooling zone maintained at a temperature between the aforedescribed temperature of said solution and 165° F. and a pressure ranging from atmospheric to about 50 p.s.i.g.; gradually reducing the pressure in said zone, thus causing cyclohexane vaporization, to produce a gradual lowering of temperature, by evaporative cooling, within the range 1 to 20 Fahrenheit degrees per minute, continuing the decrease in temperature and pressure until the pressure reaches approximately atmospheric and the temperature has been lowered to a value in the range 165 to 180° F., thus precipitating from 25 to 95 percent of the total dissolved polymer in granular form; passing the resulting mixture to a flash zone maintained at subatmospheric pressure and a temperature in the range 75 to 160° F. and substantially instantaneously vaporizing cyclohexane and said mixture to effect evaporative cooling and precipitation of remaining dissolved polymer; and recovering polymer thus precipitated.

4. A process, for the recovery of polyethylene, having a density in the range 0.94 to 0.96, from solution in cyclohexane, the polyethylene concentration in said cyclohexane being in the range 2 to 8 weight percent, which process comprises introducing said solution, at a temperature above 165° F. and sufficient to maintain said polyethylene in solution, into a cooling zone maintained at a temperature between the aforedescribed temperature of said solution and 165° F. and a pressure ranging from atmospheric to about 50 p.s.i.g.; gradually reducing the pressure in said zone, thus causing cyclohexane vaporization, to produce a gradual lowering of temperature, by evaporative cooling, within the range 1 to 20 Fahrenheit degrees per minute, continuing the decrease in temperature and pressure until the pressure reaches approximately atmospheric and the temperature has been lowered to a value in the range 165 to 180° F., thus precipitating from 65 to 95 percent of the total dissolved polyethylene in granular form; passing the resulting mixture to a flash zone maintained at subatmospheric pressure in the range 2 to 10 p.s.i.a. and a temperature in the range 75 to 160° F. and substantially instantaneously vaporizing cyclohexane from said mixture to effect evaporative cooling and precipitation of remaining dissolved polyethylene in an amount up to a cumulative total of 98 percent of the dissolved polyethylene originally in solution; and recovering polyethylene thus precipitated.

References Cited in the file of this patent

UNITED STATES PATENTS

| | | |
|---|---|---|
| 2,388,160 | Krase | Oct. 30, 1945 |
| 2,457,238 | Hunter et al. | Dec. 28, 1948 |
| 2,478,703 | Moore | Aug. 9, 1949 |
| 2,482,056 | Elwell et al. | Sept. 13, 1949 |
| 2,669,557 | Wheaton | Feb. 16, 1954 |
| 2,728,758 | Field et al. | Dec. 27, 1955 |

FOREIGN PATENTS

| | | |
|---|---|---|
| B32,727 | Germany | July 5, 1956 |
| 777,197 | Great Britain | June 19, 1957 |

UNITED STATES PATENT OFFICE
CERTIFICATION OF CORRECTION

Patent No. 2,964,516            December 13, 1960

William B. Henderson

It is hereby certified that error appears in the above numbered patent requiring correction and that the said Letters Patent should read as corrected below.

Column 10, line 5, for "and said" read -- from said --.

Signed and sealed this 13th day of June 1961.

(SEAL)
Attest:

ERNEST W. SWIDER
Attesting Officer

DAVID L. LADD
Commissioner of Patents